March 30, 1926. 1,578,585
J. B. DAVIS
LIQUID DISPENSING APPARATUS
Filed Nov. 7, 1921 4 Sheets-Sheet 2

INVENTOR
John B. Davis
BY Chapin & Neal
ATTORNEYS.

Patented Mar. 30, 1926.

BEST AVAILABLE COPY 1,578,585

UNITED STATES PATENT OFFICE.

JOHN B. DAVIS, OF SPRINGFIELD, MASSACHUSETTS. ASSIGNOR TO GILBERT & BARKER MANUFACTURING COMPANY, A CORPORATION OF MASSACHUSETTS.

LIQUID-DISPENSING APPARATUS.

Application filed November 7, 1921. Serial No. 513,368.

*To all whom it may concern:*

Be it known that I, JOHN B. DAVIS, a citizen of the United States, residing at Springfield, in the county of Hampden and State of Massachusetts, have invented new and useful Improvements in Liquid-Dispensing Apparatus, of which the following is a specification.

This invention relates to an improved liquid dispensing apparatus, which, while capable of general application, is particularly adapted for use in dispensing gasoline and the like.

The invention, in one aspect, seeks to provide, in connection with a reciprocating piston pump and its actuating means, a measuring chamber or reservoir connected to be supplied from the pump, together with a slidable discharge pipe for the reservoir movable to various discharge positions to permit different measured quantities to be dispensed, and means operable as the pipe is moved to any of its various discharge positions to lock the pump actuating means.

Another object of the invention is to provide a dispensing reservoir of the visible measuring type which can be applied to a standard non-visible measuring pump, characterized in that the reservoir is applied in place of the usual cap on the upper end of the casing which houses the pump piston rod in its reciprocating movement, such casing also serving to house parts of the discharge mechanism for the reservoir and the operating mechanism therefor.

Another object of the invention is to provide a registering mechanism for totalizing the quantities discharged, characterized in that it is operated by the setting of the sliding discharge pipe and proportionately to the movement thereof.

Another object of the invention is to so arrange the registering mechanism, which operates step by step as the discharge pipe moves from one position to another, that the movement of the pipe from one position to the next is registered in advance shortly after leaving one position and considerably before reaching the next position.

Another object of the invention is to arrange the registering mechanism to indicate half the quantity discharged from the reservoir as the discharge pipe is moved into position to discharge such quantity and to register the remainder during the return movement of said pipe.

Other objects and advantages relate to various details of construction, as will appear from the following description.

The invention will be best understood from a description of the preferred embodiment thereof, illustrated in the accompanying drawings, in which,—

Referring to the drawing, the greater part of the illustrated apparatus is enclosed within a casing comprising a lower cylindrical member 14 (Figs. 1 and 4), an upper member 16 of elliptical cross-sectional contour, and an intermediate member 18, the latter being constructed and arranged to fit over the top of the lower casing member 18 and within the bottom of the upper casing member 16. Located within the lower casing member 14 is a pump cylinder 20 which is connected by a pipe 22 (Fig. 3) with a source of liquid supply (not shown) and by a pipe 24 with a transparent reservoir or measuring chamber 26 which is supported upon a frame member 28 which surmounts the upper casing member 16. The actuating mechanism for the pump piston is substantially the same in construction and mode of operation as that disclosed in the inventor's copending application Serial No. 401,966, filed August 7, 1920, and consequently it will not be necessary to describe said mechanism in detail herein, reference being made to said application for a complete disclosure thereof. For present purposes, it will be sufficient to state that the pump piston (not shown) is adapted to be actuated either by power or manually, as may be desired and briefly to describe the operating mechanism as follows: The piston rod 30 (Fig. 4) of the pump piston (not shown) carries a crosshead 32 which is adapted to reciprocate within the intermediate and upper portions of the pump casing and which is connected, at its opposite ends, to the upper extremities of a pair of rack bar operating rods 34. The lower ends of the rods 34 are provided with pistons, one of which is shown at 36 in Fig. 3, and these pistons fit within cylinders 38 which are adapted to be supplied with compressed air or other fluid under pressure, the fluid being admitted to the cylinders 38 beneath the pistons or exhausted therefrom through connections 40 under the control of a suitable valve (not shown). Upon the admission of air to the cylinders 38, the operating rods 34 are raised to actuate the pump piston through its suction stroke, while the exhaustion of air from said cylinders permits the pump piston, which is of heavy construction, to be returned by gravity into position for the start of another suction stroke. To enable the pump to be operated by hand when desired, a pair of pinions 42 which are secured upon a rotatable horizontal shaft 44 are arranged to mesh with the teeth of the rack bar operating rods, and a crank handle 46 is rotatably mounted at one end of the shaft 44 and is adapted to be clutched to said shaft so as to enable the latter to be rotated to raise the operating rods. Not only all the above-named parts, but also the pump casing, hereinbefore-mentioned, are substantially the same in construction as corresponding elements described in the application already referred to.

The frame member 28 which surmounts the pump casing and supports the reservoir 26 comprises a lower disk-like plate 50 (Fig. 4) which serves as cap to close the top of the upper casing member 30, an upstanding cylindrical neck 52, and a horizontal annular rim 54 projecting outwardly from the top of the neck 52. A vertically disposed annular flange 56 depends from the marginal portion of the plate 50 and fits within the upper end of the casing member 16 to which it is rigidly secured. A horizontal web 58 extends across the interior of the neck 52, intermediate the upper and lower ends thereof, and beneath the web a curved vertical wall 60 and a horizontal wall 62 serve in conjunction with portions of said web and of the wall of said neck to form a discharge chamber 64. Leading from the discharge chamber 64 is a delivery pipe 66 and said chamber is adapted to be connected with the interior of the reservoir 26 through means including a sliding vertical discharge pipe 68 hereinafter to be described.

Figures 1, 2, 3:
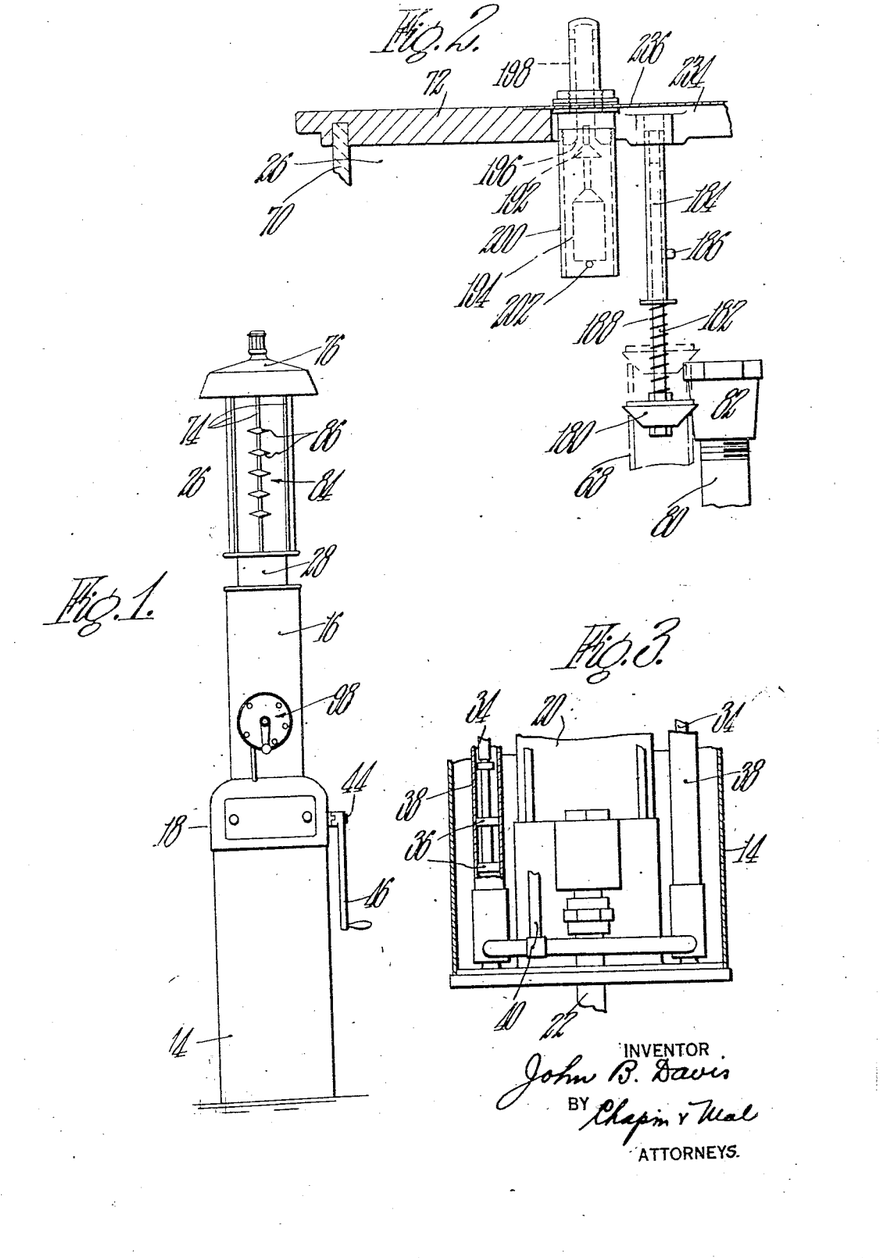
Fig. 1 is a view, in front elevation, of the improved liquid dispensing apparatus.
Fig. 2 is a vertical sectional view of a small portion of the reservoir showing, in elevation, certain elements associated therewith.
Fig. 3 is a fragmentary front elevational view of the lower portion of the pump, the outer casing and a portion of one of the power cylinders.

The reservoir 26 is preferably of a general cylindrical form having its side wall constructed of glass. As shown, an open ended glass cylinder 70 is arranged with its axis vertical and its lower edge resting within an annular groove in the rim 54 of the frame member 28. The upper edge of the glass cylinder is disposed in a groove in the lower face of a disk or cap plate 72 and the cap plate and the rim 54 are drawn together by means of tie rods 74 so that the glass cylinder is securely held in place to form a fluid-tight reservoir. The cap plate 72 may be surmounted by a hood 76 as shown in Fig. 1. If desired, the cylindrical shell 26 may be constructed of opaque material and provided with one or more transparent inserts for rendering visible the level of the liquid within the reservoir. The interior of the neck 52, above the web 58, communicates with the interior of the reservoir thus forming a pocket 78 in the base of the latter into which the pipe 24 delivers oil from the pump cylinder. An overflow pipe 80 rises from the source of liquid supply through the pump casing, through the neck of the frame member 28 at one side of the discharge chamber 64, and through the reservoir to a point just below the cap plate 72. Threaded upon the upper end of the overflow pipe 80 is an adjustable inlet portion 82 which is capable of being turned and thus raised or lowered to vary the effective height of the overflow pipe. The inlet portion 82 is adapted to be adjusted so that after the pump has been operated to fill the reservoir a small quantity of the liquid will escape through the overflow pipe and the liquid remaining in the reservoir will come to rest at the proper level relatively to a scale 84 by which the quantities of liquid dispensed are indicated. The scale 84, as shown in Fig. 1, may conveniently be formed of a series of individual markers 86 which are secured at graduated intervals upon one of the tie-rods 74.

After the pump has been actuated to fill the reservoir 26 and the liquid within the reservoir has been brought to a predetermined level through the agency of the overflow pipe 80, the sliding discharge pipe 68 is set to draw from the reservoir the desired measured amount of liquid. The discharge pipe 68 is open at both ends and, when moved into any of its various discharge positions, its upper end is in constant communication with the reservoir. The lower portion of pipe 68 extends into a well 90 depending from the plate 50, said container or well being of slightly greater diameter than the discharge pipe 68 and communicating at its upper end with the discharge chamber 64. The discharge pipe 68 is mounted for vertical sliding movement through a combined bearing and stuffing box 92 that is provided within the frame member 28 to insure a liquid-tight connection at the base of the reservoir. To enable the discharge pipe to be set for the withdrawal of different measured quantities of liquid from the reservoir 26, the upper end of the discharge pipe 68 is connected by a cross-head 94 with a rack-bar operating rod 96, which extends vertically through the frame member 28 and into the casing member 16.

Figures 4, 5, 6, 7:
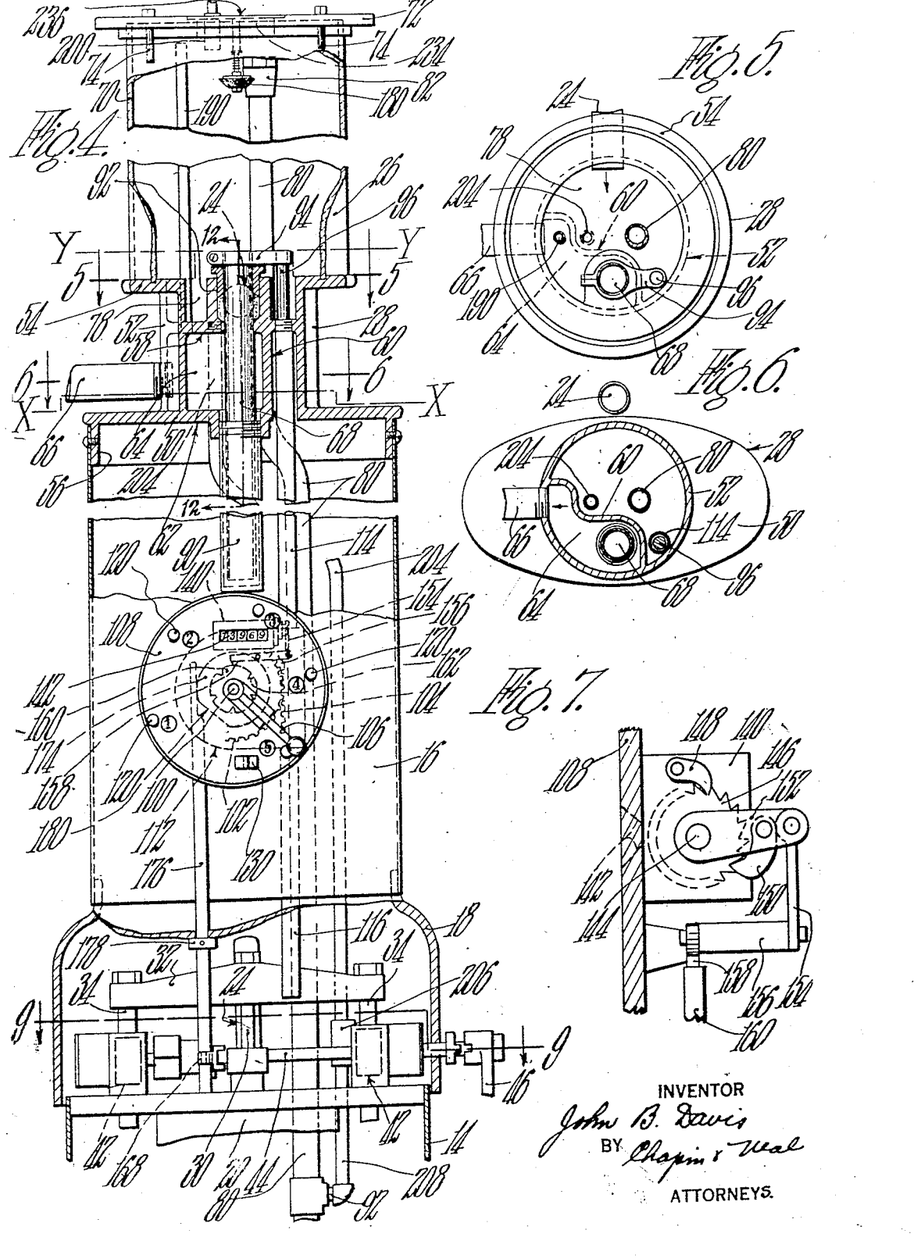
Fig. 4 is a view, partially in front elevation and partially in central vertical section, of the portion of the pump above the pump cylinder.
Fig. 5 is a horizontal sectional view taken on the line 5—5 of Fig. 4.
Fig. 6 is a horizontal sectional view taken on the line 6—6 of Fig. 4.
Fig. 7 is a detail view showing, in side elevation, a portion of the counting mechanism.
Figure 8:
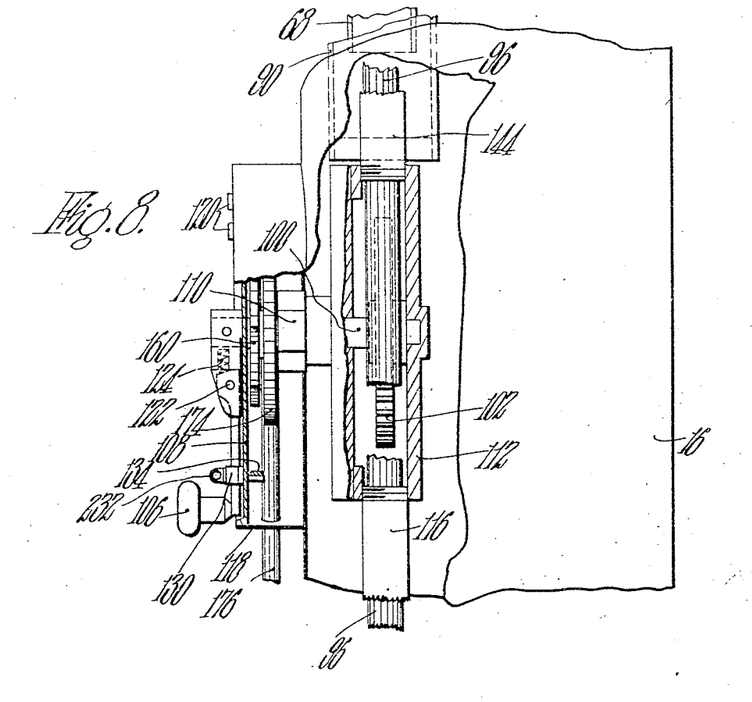
Fig. 8 is a detail view, partially in side elevation and partially in section, of the mechanism for setting the discharge means to deliver different measured quantities of liquid.

Manually operable setting mechanism, indicated generally at 98 in Fig. 1, is provided for the discharge pipe 68 and such mechanism, as shown in Figs. 4 and 8, comprises a horizontal shaft 100 having fixed at one end a gear 102 which meshes with rack teeth 104 on the operating rod 96. Fixed to the other end of said shaft is a crank handle 106 which is movable across the face of a circular dial plate 108. The shaft 100 is journaled in a combined bearing and stuffing box 110 (Fig. 8) carried by a housing 112, which encloses the gear 102 and through which the rack-bar operating rod 96 extends. The housing 112 is supported by means of a sleeve 114 which surrounds the operating rod 96 between the housing 112 and the web 58, said sleeve being threaded or otherwise secured at its opposite ends to said web and housing in such a way as to provide for liquid-tight connections at these points. The operating rod extends below the housing 112 and is there enclosed within a liquid-tight housing sleeve 116, the upper end of which is secured to the housing 112. The above-described provision for housing the operating rod 96 and the gear 102 insures against leakage of liquid from the reservoir into the pump casing at the point where said rod passes through the web 58, and avoids the necessity of employing a stuffing box at this point where the arrangement of parts is such that it would be difficult to properly construct or adjust a stuffing box.

Figures 9, 10, 11:
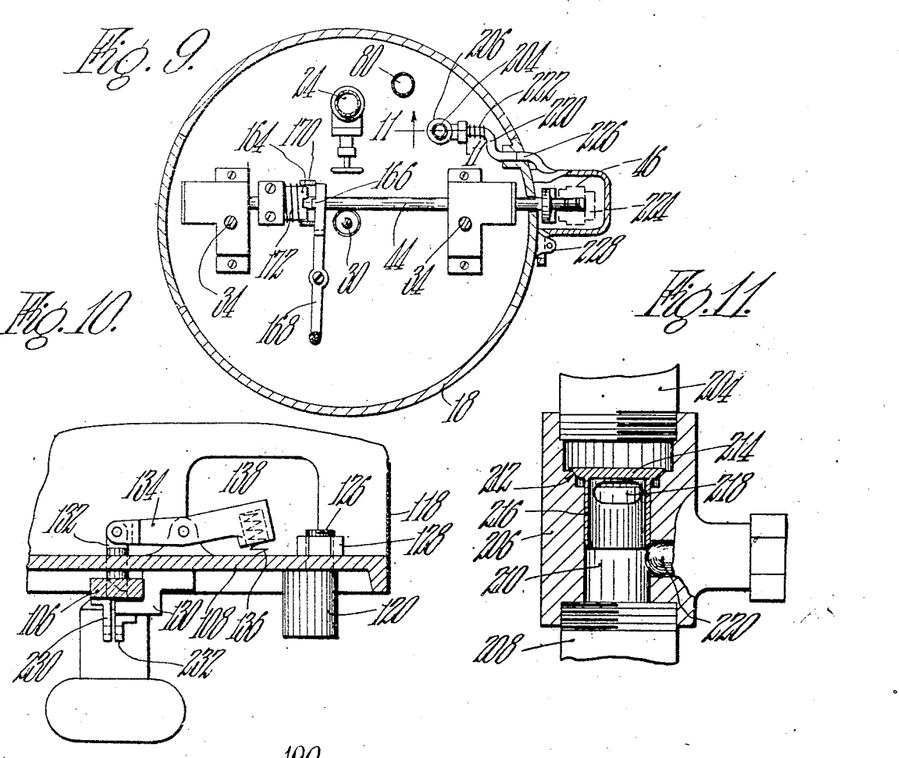
Fig. 9 is a horizontal sectional view taken on the line 9—9 of Fig. 4, the crank handle having been removed and the protruding portion of the crank shaft being enclosed by means of a safety housing.
Fig. 10 is a sectional detail view of a locking device for the setting mechanism.
Fig. 11 is a detail sectional view taken substantially along the line 11—11 of Fig. 9, showing the drain valve.
Figure 12:
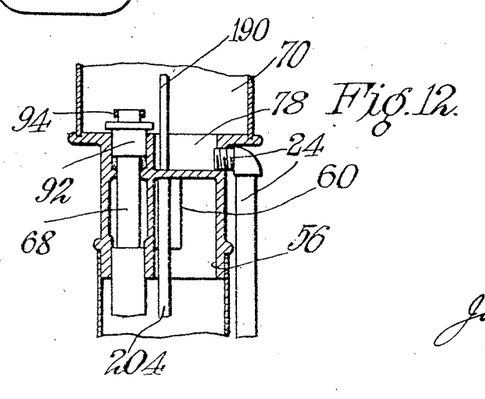
Fig. 12 is a sectional view taken along the line 12—12 of Fig. 4.

The dial plate 108 is centrally apertured to permit the projection therethrough of the front end of the shaft 100 and is secured along its periphery to a casing 118 that is secured to the front of the pump casing member 16. A plurality of stop pins 120 project from the face of the dial plate 108 to engage and position the crank arm and thus to position the discharge pipe 68 vertically for the withdrawal from the reservoir of different measured quantities of liquid. In the illustrated apparatus, the reservoir 26 is adapted to dispense a maximum quantity of five gallons of liquid and, accordingly, the stops 120 are so spaced angularly about the dial 108 that, when the crank arm 106 engages any of these stops, the discharge pipe 68 will be so set as to permit the discharge of the unit quantity indicated on the dial beside the stop engaged. The proper side of each stop, to define the measured quantity indicated, is that which would first be engaged by the crank arm 106 on clockwise revolution of the latter. To permit this crank arm 106 to pass by certain of the stops 120, it is made in two parts which are pivoted together at 122, as clearly shown in Fig. 8. A spring 124 normally holds the two sections of the crank arm in a common plane but permits the outer section to be lifted sufficiently to pass all of the stops 120 except the five gallon stop, which is shown in Fig. 10 and which, as will be seen from a comparison of its height with those shown in Fig. 8, is sufficiently high to prevent passage of the crank arm 106 even when its outer section is lifted to the maximum amount permissible. All of the stops 120 are adjustable in a similar manner, which is illustrated in Fig. 10, wherein the stop is shown as having an eccentrically located and screw threaded shank 126 which passes through the dial 108 and is clamped thereto by a nut 128. By loosening the latter, the stop 120 may be turned and adjusted to various positions, within limits, as necessary.

The discharge pipe 68, except during the times when liquid is being discharged from the chamber 26, is normally held in its uppermost position and, when thus positioned, the crank arm 106 engages a stop 130, which, as shown in Fig. 10, is so constructed as to prevent relative movement between the two sections of the crank arm. When the crank arm engages stop 130 a detent 132, which is slidably mounted in dial 108 and is pivotally connected to one arm of a lever 134, pivoted intermediate its ends to such dial.

engages in a recess in the crank arm 106 and holds it against clockwise movement, movement in the opposite direction being restrained by the stop 130. A spring 136 acts between the rear face of dial 108 and the other end of lever 134 to constantly urge the detent 132 outwardly so that, as arm 106 is swung into the illustrated position, the detent automatically snaps into engagement with it. The casing 118 is provided with a recess 138, located inconspicuously, as in its under face, through which recess access may be had to lever 134 for the purpose of manually effecting the withdrawal of detent 132 and the unlocking of crank arm 106.

The registration of the quantities dispensed from the pump is effected by a totalizing register, indicated conventionally at 140, which register is actuated by the sliding movements of the discharge pipe 68. Register 140 is of the well-known cumulative or cyclometer type and requires no detailed description. It is fixed to the rear face of dial 108 and its indications are visible through an opening 142 in the latter. The actuating shaft of register 140 is shown at 144 in Fig. 7 and this shaft carries a ratchet 146, with which is associated a holding pawl 148. An actuating pawl 150, pivoted to a lever 152 pivotally mounted on shaft 144, is arranged to reciprocate and on one stroke of each reciprocation to move ratchet 146 one step, say one tooth. Lever 152 is connected by a link 154 to one end of a lever 156 which is pivoted intermediate its ends to dial 108 and carries at its other end a V-shaped detent 158. The latter rides on the periphery of a disc 160 fixed to the described shaft 100 and this disc has a plurality (five as illustrated) of V-shaped notches 162 into which the detent 158 successively drops as crank handle 106 is turned in either direction. As the detent becomes positioned over a notch 162, the weight of lever 156 carries its left-hand end (as viewed in Fig. 4) downwardly, thereby raising its other end and moving pawl 150 without moving the ratchet. As the disc 160 continues to turn the detent 158 is forced upwardly out of the notch 162, which causes the right-hand end of lever 156 to be pulled downwardly, thereby causing the pawl 150 to turn ratchet 152 one tooth. Ratchet 146 has twenty teeth and one revolution thereof causes an indication of ten units on register 140, whereby, on each operation of lever 156, one-half unit only is recorded. The notches 162 are so located that as crank arm 106 is moved a slight distance away from stop 130, or from those of the stops 120 which are numbered 1 to 4 inclusive, the detent 158 will be allowed to drop. The idea is to register the movement of the discharge pipe in advance and prevent it from being moved any substantial distance without operating the register. This prevents an operator from cheating his employer and works no injury on the purchaser because the latter should check the operator by observing the setting of the crank arm and level of liquid in chamber 26. Since the disc 160 when turned in either direction operates the register, one-half the quantity is registered on clockwise movement of the crank arm 106 and the other half on reverse movement thereof. The operator, therefore, cannot possibly manipulate the crank arm 106 without operating the register 140 to indicate that the discharge pipe has been moved to a position to permit discharge, whether or not such discharge has taken place and, since registration of each step of movement is made in advance, there is no chance for the operator to cheat his employer by manipulation of this crank arm.

To further protect the employer, means are provided whereby the pump cannot be operated while pipe 68 occupies any of its discharge positions. This prevents the operator from setting the pipe 68 and registering a small amount, say one gallon, by the setting operation, and then operating the pump over and over again to supply the chamber 26 and to discharge therefrom at the same time, all without any indication, other than the disproportionate one named, on the register. To this end, a clutch element 164 (Fig. 9) is fixed on the shaft 44, which, as already described, turns during reciprocation of the pump piston. A mating clutch element 166 is carried on one end of a lever 168 which is pivoted intermediate its ends to the top wall of pump 20. A ring 170 fits loosely over element 164 and is urged by a spring 172 against element 166, thereby tending to hold these elements disengaged. To engage these elements, a cam 174 is fixed to shaft 100 and one end of a lever 176 rides upon the periphery of this cam. Lever 176 consists of a rod which extends downwardly through casing 118 thence downwardly through the upper wall of casing 18 and into the latter, where it is supported by resting upon the free end of lever 168, the latter having a vertical hole therein to loosely receive the necked down end of lever 176. The latter is held against upward displacement by a collar 178, which cooperates with the inner surface of casing 18 for this purpose, and the fulcrum for lever 176 is constituted by the casing 18 itself, such fulcrum being located slightly above the collar 178. The cam 174 consists of a circular disc except for a flat portion 180 which parallels the crank arm 106 and which, when the latter engages stop 130, permits the upper end of lever 176 to move to the right, as viewed in Fig. 4, thereby permitting spring 172 to separate the clutch elements 164 and 166 and release the pump for operation. As soon as crank arm 106 is moved away from stop 130, cam 174 moves lever 176 into the illustrated position and forces the clutch elements into engagement against the tension of spring 172.

Thus, pump 20 cannot be operated to supply the chamber 26 until the sliding discharge pipe 68 has been raised to its uppermost position. As pipe 68 nears this position, it engages a valve 180 (Figs. 2 and 4) the stem 182 of which is mounted for vertical sliding movement in a sleeve 184 which is fixed to and depends from the top wall 72 of chamber 26. A pin 186, fixed to stem 182, projects through a longitudinal slot in sleeve 184 and limits the extent of movement of stem 182. A spring 188 encircles the latter and acts between the lower end of sleeve 184 and the upper face of valve 180 to hold the latter in its lower position. After the pipe 68 engages valve 180, it continues to move a short distance in order to compress spring 188 and insure that valve 180 is tightly pressed against the upper end of pipe 68. The latter is thus closed at its upper end prior to the inflow of liquid into chamber 26, and thus no liquid can enter this pipe, or the well 90, or chamber 64, until the pipe is moved to discharge position. This is important, since the markers 86 are located to graduate the chamber 26 when the pipe is in its upper position and, if the pipe was left open, overmeasure would result. If it were possible to fill chamber 26 when pipe 68 was set in any of a number of various positions, no accuracy of measurement would follow for varying additional amounts of liquid would be contained in pipe 68, depending on its position. As shown, the chamber 26 discharges to the level of the discharge pipe 68, the lowest level being that indicated by the line $y-y$ in Fig. 4, and the discharge pipe and discharge chamber 64 drain to the level $x-x$. The discharge pipe will always be empty down to this level at the end of a dispensing operation and, since it must be lifted to its upper position prior to replenishment of chamber 26, in which position its upper end is closed, it is kept empty until again moved to one of its discharge positions. The apparatus cannot be operated in any but the prescribed way and, when so operated cannot inaccurately measure, if the chamber 26 is properly graduated and stops 120 properly set.

To further guard against inaccuracy of measurement, which may under certain circumstances occur due to a siphon action tending to draw out liquid from the discharge chamber 64 and well 90 below the level $x-x$, an anti-siphon device is provided. Such device consists of a vent passage for the otherwise closed chamber 64 and is herein shown as a pipe 190 leading from the top wall 58 of chamber 64 and extending upwardly into the measuring chamber 26 to a position well above the top of the overflow pipe 80 into the air space of chamber 26. An automatic vent valve is also associated with the latter, as shown in Fig. 2, wherein a valve 192, attached to a float 194, is arranged to engage a valve seat 196 as the liquid rises in chamber 26 and close an air inlet passage 198 provided in the top 72 of the chamber. On recession of the liquid, valve 192 drops by gravity and opens this passage to admit air to replace the liquid and prevent the creation of a vacuum in chamber 26. The float 194 and its attached valve 192 are located in a sleeve 200, secured to and depending from the member 72, and a pin 202 passing diametrically through sleeve 200 limits the downward movement of float 194. It will thus be seen that whenever liquid is withdrawn from chamber 26, the latter is vented to permit free flow and that the discharge chamber 64 is also vented to prevent the creation of a vacuum therein which might permit withdrawal of liquid below the level $x-x$ due to siphonic action.

It is usually desirable to drain the chamber 26 at certain times, particularly after business hours and I provide a draining means, which, while capable of actuation at other times, is automatically actuated by the locking of the apparatus. From the base of chamber 26, a drain pipe 204 leads downwardly, through neck 52 outside chamber 64, through casing 16 and into the casing 18, where it is connected to the upper end of a drain valve 206. The lower end of the latter is connected by a pipe 208 to the overflow pipe 80, which as already described leads back to the supply tank. The location of the drain valve is best shown in Fig. 9 and its interior construction in Fig. 11. The valve 206 has a vertical passage 210 therethrough, intermediate the ends of which is a seat 212. A valve element 214, having a guide tube 216, is normally held to seat 212 by gravity action to close off communication between pipes 204 and 208. Openings 218 are provided in tube 216, to permit such communication when valve 214 is raised from its seat. The lifting of the valve is effected by the cam action of a pin 220 which is slidably mounted in the casing of valve 212 and has a rounded end to engage the lower end of tube 216 when the pin is forced inwardly into passage 210. Pin 220 passes outwardly from the valve casing through a suitable stuffing box, as indicated, and is offset, as shown in Fig. 9, and the outer end thereof is slidably received in the outer wall of casing 18. A spring 222, acting between the valve casing and the bent portion of pin 220, tends to hold the latter in its outer position; in which the bent portion thereof abuts the casing 18 as a stop. To drain the chamber 26 at any time, it is simply necessary to push pin 220 inwardly. This result is also accomplished when the pump is locked. To lock the pump, a cap 224 (Fig. 9) is placed over the protruding end of shaft 44 and this cap has a pin 226 which engages pin 220 and, when the cap is forced against casing, moves it inwardly to lift valve element 214. The cap 224 has a slot therein to receive a lug 228 on casing 18 and this lug has an opening therein, as shown, to receive a padlock, whereby removal of cap 224 is prevented.

The crank arm 106 may also be locked, if desired, by inserting a padlock through two abutting ears 230 and 232 (Fig. 10) one of which is secured to the crank arm and the other to stop 130.

To facilitate assembly of the vent valve 192 and discharge pipe valve 180 and to permit access to chamber 26 for various purposes, as for adjustment of member 82 and the stuffing box 92, a hand hole 234 (Figs. 2 and 4) is provided in its top wall 72, which hand hole is normally closed by a plate 236 to which the sleeves 200 and 184, supporting the described valves, are secured.

In operation, the reservoir 26 is supplied with liquid by operating the pump 20 through either of the actuating means provided, the liquid passing upwardly through pipe 24 into the base of the chamber. Under normal conditions, one full stroke of the pump suffices to fill the reservoir, but under other conditions a greater or lesser extent of operation may be required. However, the pump is operated until the liquid in the reservoir rises above the top of overflow pipe 80, after which the pump piston is allowed to descend to its normal and lowermost position. Previous to this and as a prerequisite to operation of the pump, the discharge pipe 68 had to be moved to its uppermost position and, as it neared this position, it engaged and lifted valve 180, thereby closing the intake end of the discharge pipe. Should the level of fluid rise too high in the reservoir, the vent valve 192 will automatically close to prevent escape of the liquid. On cessation of pumping, the vent valve, if closed, opens and the liquid in the reservoir levels itself off, the excess quantity pumped returning through overflow pipe 80 into the supply tank.

The operator then turns the crank arm 106 to set the discharge pipe to deliver the desired measured quantity, which then flows out pipe 66 provided the valve, usually associated with this pipe or with the delivery hose attached thereto, is open. As the operator turns arm 106 away from stop 130 a slight distance, the register 140 is operated to indicate one-half gallon. This prevents the operator from discharging a small quantity without registering it and is a safeguard primarily intended for the employer,—the customer being amply protected because he can observe the graduations in the reservoir 26 and also the setting of the crank arm. The indications of the movement of the discharge pipe are thus made in advance, although such indications show only half the movement, the remainder being registered on the return stroke of arm 106. Should the arm be advanced beyond the one gallon stop 120, a similar operation would result, the arrangement being such that the discharge pipe 68 cannot be set so as to deliver liquid without first registering its movement. Also, the pump actuating means is always locked as soon as arm 106 is moved sufficiently far away from stop 130 to disengage pipe 68 from valve 180 so that the pipe cannot be set in a delivery position and the pump then operated to deliver liquid without registering it. At the end of the dispensing operation the pipe 68 is usually returned to its upper position so as to be in readiness for the next dispensing operation, but, if not thus returned, it must be returned before the reservoir can again be filled.

It will thus be seen that the apparatus is designed not only to safeguard the customer by the provision of the transparent wall in reservoir 26, but also to prevent fraud on the owner of the apparatus by dishonest employees.

The invention has been disclosed herein, in an embodiment at present preferred, for illustrative purposes, but the scope of the invention is defined by the appended claims rather than by the foregoing description.

What I claim is—

1. In a liquid dispensing apparatus, a reservoir, a reciprocating piston pump for forcing liquid into said reservoir, means including a movable member operatively connected with the pump piston for actuating said pump, a slidable discharge pipe associated with said chamber and movable to various positions therein to permit discharge of different measured quantities of liquid therefrom, and mechanism operable by movement of said pipe into any of said positions to lock said member to prevent operation of the pump actuating means.

2. In a liquid dispensing apparatus, a reservoir, a reciprocating piston pump for forcing liquid into said reservoir, means including a member mechanically connected with the pump piston for actuating said pump, a slidable discharge pipe associated with said chamber and movable to various positions therein to permit discharge of different measured quantities of liquid therefrom, means for moving said pipe, and mechanism connecting said member with the last-named means to prevent movement of said pipe to any of said positions during operation of said pump.

3. In a liquid dispensing apparatus, a reservoir, a reciprocating piston pump for forcing liquid into said reservoir, means including a rotatable shaft for actuating said pump, a slidable discharge pipe associated with said chamber and movable to various positions therein to permit discharge of different measured quantities of liquid therefrom, means for moving said pipe, a locking device for said shaft, and means operable by the pipe moving means to operate said locking device when said pipe is moved into any of said positions.

4. In a liquid dispensing apparatus, a reservoir, a reciprocating piston pump for forcing liquid into said reservoir, means for actuating said pump, a slidable discharge pipe associated with said chamber and movable to various positions therein to permit discharge of different measured quantities of liquid therefrom, a rotatable clutch element movable with said actuating means, a non-rotatable clutch element adapted to mate with the first element and lock said actuating means, and means operable by movement of said pipe into any of said various positions to engage said clutch elements.

5. In a liquid dispensing apparatus, a reservoir, means for supplying liquid thereto, a slidable discharge pipe associated with said reservoir and movable from one position to various other positions in which it is effective to permit the discharge of different measured quantities of liquid, an operating member for moving said pipe, a cam movable by said member, and means operable by said cam for locking the liquid supplying means against actuation.

6. In a liquid dispensing apparatus, a reservoir, a pump for supplying liquid thereto, actuating means for said pump, a slidable discharge pipe associated with said reservoir and movable from one position to various other positions in which it is effective to permit the discharge of different measured quantities of liquid, an operating member for moving said pipe, a cam movable by said member, and means operable by said cam for preventing operation of said actuating means.

7. In a liquid dispensing apparatus, a reservoir, means for supplying liquid thereto, a slidable discharge pipe vertically movable in said chamber, a rack bar the upper end of which is connected within said chamber to the corresponding end of said pipe, a gear casing below said chamber, a gear therein meshing with the rack bar, means operable from without the casing for turning said gear, and a housing enclosing the rack bar between said casing and chamber, and a well depending from said casing into which the rack bar may extend.

8. In a liquid dispensing apparatus, a reservoir, means for supplying liquid thereto, a slidable discharge pipe vertically movable in said chamber, a member movable back and forth to set said pipe in various discharge positions, and cumulative registering mechanism operable by movement of said member in one direction to register half the quantity discharged and to register the remainder when moved in an opposite direction to its original position.

9. In a liquid dispensing apparatus, a reservoir, means controlling the discharge of liquid therefrom including a member movable from one position to various others and back again, and cumulative registering mechanism operable by movement of said member in one direction to register half the quantity discharged and to register the remainder when returned to its original position.

10. In a liquid dispensing apparatus, a reservoir, means controlling the discharge of liquid therefrom including a member movable from one position in which discharge is not permitted to various others in which different measured quantities may be discharged, and cumulative registering mechanism operable by movement of said member in each direction to totalize the quantities of liquid withdrawn from said reservoir.

11. In a liquid dispensing apparatus, a reservoir, means controlling the discharge of liquid therefrom including a member movable from one postion in which discharge is not permitted to various others in which different measured quantities may be discharged, and cumulative registering mechanism operable during the early part of the movement of said member from any of said positions to the next succeeding position to indicate in advance a quantity proportional to the quantity to be dispensed at the completion of said movement.

12. In a liquid dispensing apparatus, a reservoir, means controlling the discharge of liquid therefrom including a member movable from one position in which discharge is not permitted to various others in which different measured quantities may be discharged, and cumulative registering mechanism operable during the movement of said member from one position to another to indicate said movement in advance of its completion.

13. In a liquid dispensing apparatus, a reservoir, means controlling the discharge of liquid therefrom, a handle to actuate said means and oscillatable from one position in which said means is ineffective to discharge to various other positions in which it is effective to discharge different measured quantities, stops for limiting the oscillation of said handle one of which arrests the latter when said means is set to discharge the maximum quantity and the other of which arrests the handle when said means is set in the first-named position, intermittently operable registering means, and means operable as said handle is moved away from the first-named position and for each succeeding position except the last to indicate in advance the actuation of said means for the next succeeding position.

14. In a liquid dispensing apparatus, a reservoir, means controlling the discharge of liquid therefrom, a handle to actuate said means and oscillatable from one position in which said means is ineffective to discharge to various other positions in which it is effective to discharge different measured quantities, stops for limiting the oscillation of said handle one of which arrests the latter when said means is set to discharge the maximum quantity and the other of which arrests the handle when said means is set in the first-named position, intermittently operable registering means, and means operable as said handle is moved away from the first-named position and for each succeeding position except the last to indicate in advance half the quantity for which said means is set to discharge and to indicate the other half on its return stroke.

15. In a liquid dispensing apparatus, a reservoir, means controlling the discharge of liquid therefrom, a handle to actuate said means and oscillatable from one position in which said means is ineffective to discharge to various other positions in which it is effective to discharge different measured quantities, stops for limiting the oscillation of said handle one of which arrests the latter when said means is set to discharge the maximum quantity and the other of which arrests the handle when said means is set in the first-named position, intermittently operable registering means, a notched disc movable by said handle, pawl and ratchet mechanism for actuating said registering means, and a follower riding on said disc and connected to said mechanism.

16. In a liquid dispensing apparatus, a reciprocating piston pump, actuating means therefor including a rotatable shaft and a crank handle engageable and disengageable therewith, a casing enclosing the pump leaving an end of said shaft and said crank handle exposed, a reservoir connected to the delivery end of said pump, discharge means therefor, a drain pipe for said reservoir, a normally closed valve controlling the drain pipe and located within the casing adjacent said end of the shaft, a cover to house such end of the shaft after the crank handle is removed and capable of being locked to said casing, and means connected with the cover for opening the drain valve when the cover is applied to the casing to house the end of said shaft.

In testimony whereof I have affixed my signature.

JOHN B. DAVIS.